(12) United States Patent
Musoll

(10) Patent No.: US 6,282,614 B1
(45) Date of Patent: Aug. 28, 2001

(54) APPARATUS AND METHOD FOR REDUCING THE POWER CONSUMPTION OF A MICROPROCESSOR WITH MULTIPLE LEVELS OF CACHES

(75) Inventor: Enrique Musoll, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/292,541

(22) Filed: Apr. 15, 1999

(51) Int. Cl.$^7$ .............................. G06F 9/44; G06F 12/00
(52) U.S. Cl. ..................... 711/122; 711/113; 711/136; 711/137; 711/138; 712/233; 712/234; 712/237; 712/239
(58) Field of Search .................. 711/113, 122, 711/136–138, 217–224; 712/233–240

(56) References Cited

U.S. PATENT DOCUMENTS

| | | | |
|---|---|---|---|
| 5,506,976 | 4/1996 | Jaggar | 712/238 |
| 5,586,295 | 12/1996 | Tran | 711/137 |
| 5,740,417 | 4/1998 | Kennedy et al. | 712/239 |
| 5,761,706 | * 6/1998 | Kessler et al. | 711/118 |
| 6,070,009 | * 5/2000 | Dean et al. | 395/704 |

OTHER PUBLICATIONS

Kessler et al., The Alpha 21264 Microprocessor Architecture, International Conference On Computer Design—VLSI In Computers and Processors, IEEE Computer Society, Oct. 5–7, 1998, Austin, TX.*

Burger, D. et al., The Simple Scalar Architectural Research Tool Set, Version 2.0, Simple Scalar Tools Home Page (http://www.cs.wisc.edu/mscalar/simplescalar.htm).

The Standard Performance Evaluation Corporation (spec) Home Page (http://www.open.specbench.org).

The Standard Performance Evaluation Corporation's (spec) Open Systems Group Home Page (http://www.open.specbench.org/osg).

The Standard Performance Evaluation Corporation's (spec) Open Systems Group SPEC CPU95 Benchmarks Home Page (http://www.open.specbench.org/osg/cpu95).

* cited by examiner

*Primary Examiner*—Than Nguyen
(74) *Attorney, Agent, or Firm*—Stallman & Pollock LLP (57) ABSTRACT

An apparatus and method for reducing the power consumption of a multi-cache microprocessor dynamically predicts the misses of an $i^{th}$-level ($L_i$) cache. This method predicts the misses in $L_i$ and accesses the i+1 level cache ($L_{i+1}$) concurrently with $L_i$ only if a miss is predicted. If a hit is predicted, $L_{i+1}$ is accessed only if the prediction is incorrect. The prediction is based on the fact that misses occur in bursts which correspond to changes of the working set. A circuit implementing this technique occupies a very small area and its delay is not in the critical path of the microprocessor. The prediction is applied to reduce the number of unnecessary accesses to $L_{i+1}$, which translates to a reduction in power consumption in the $L_{i+1}$ cache.

14 Claims, 4 Drawing Sheets

APPARATUS AND METHOD FOR REDUCING THE POWER CONSUMPTION OF A MICROPROCESSOR WITH MULTIPLE LEVELS OF CACHES

FIELD OF THE INVENTION

This invention relates to microprocessors which have two or more levels of memory caches interposed in the memory hierarchy between the main memory and the CPU.

BACKGROUND OF THE INVENTION

A memory cache or "cache" is a mechanism in the memory hierarchy between the main memory and the CPU which improves the effective memory transfer rates and raises processing speeds. The term "cache" refers to the fact that the cache mechanism is not apparent to the user, who only observes an apparently higher speed main memory.

A cache has a smaller memory storage capacity than the main memory but has a much higher access speed. Caches are generally implemented by semiconductor devices, the speeds of which are comparable to that of the processor. By contrast, the main memory generally uses a less costly, lower speed technology, but has a much higher overall storage capacity.

The cache mechanism anticipates the likely re-use by the CPU of information, whether data or code, in the main memory by organizing a copy of the data or code in cache memory. When information is accessed from the main memory, it is common for associated information also to be accessed and stored in the cache. For example, if a required code is part of a sequence of instructions, the subsequent instructions should be received with the first instruction, so that access to the main memory can be minimized.

In modern microprocessors, it is common for one or more levels of memory caches to be included on a particular chip, and for an additional level of memory cache to be off-chip. Currently, some chips contain one or two on-chip caches, and it is anticipated that future products may contain more than two on-chip and off-chip caches.

In current microprocessors which access more than one level of cache, the higher-level caches generally have a larger storage capacity than the lower-level caches. For example, in the case of a two-level cache hierarchy, the second or L2 cache generally has a larger storage capacity than the first or L1 cache. The L2 cache has a significantly greater speed than the main memory, but it also has a significantly smaller storage capacity. The information on the L1 cache is usually a subset of the information on the L2 cache. The L2 cache only needs to be accessed if the desired code or data is not resident in the L1 cache.

For chips with multiple levels of caches, there is a tradeoff between the maximum processing speed and the minimum power usage of the caches. Processing speed can be maximized by simultaneously addressing more than one cache, for example, by simultaneously addressing the L1 cache and the L2 cache. However, simultaneously addressing the L1 and L2 caches uses power unnecessarily if the desired data or code is resident in the L1 cache.

Alternatively, power consumption can be reduced by accessing the higher-level cache or caches only when necessary. In the example of a chip with a 2-level cache hierarchy, power consumption can be reduced by accessing the L2 cache only when there is a "miss," that is, when the L1 cache is addressed but the desired data or code is not currently in the L1 cache (as opposed to a "hit" where the desired data or code is currently resident). However, this method results in a larger effective access time for the L2 cache and a consequent reduction in processing speed.

A prediction of L1 cache data read misses has been implemented in the Compaq Alpha 21264. See R. E. Kessler, E. J. McLellan, and D. A. Webb, "The Alpha 21264 Microprocessor Architecture," *International Conference on Computer Design (ICCD '98)*, pp. 90–95 (October 1998) ("Kessler"), which is incorporated herein by reference.

However, the predictor described in Kessler does not disable the L2 cache for power savings. Instead, the Kessler predictor is used to reduce the penalty in those cases where a read access results in a "miss" of the L1 cache and the consumer of the read instruction was dispatched for execution before knowing if the data access resulted in a hit, in order to keep the L1 cache latency low. Therefore, if there is a miss, the consumer instruction and all the subsequent instructions have to be re-fetched with a high penalty in cycles.

To mitigate this problem, the Alpha 21264 has a data read miss predictor which consists of a saturated 4-bit counter that tracks the hit/miss behavior of recent data reads. This counter decrements by two on cycles when there is a read miss and increments by one when there is a hit. The most-significant bit of the counter is used to do the prediction.

It is an object of the present invention to provide a method for reducing power consumption in a multiple-cache microprocessor without creating an unacceptable reduction in processing speed.

SUMMARY OF THE INVENTION

The present invention seeks to overcome the disadvantages of optimizing either the processing speed or power consumption of caches independently. In the present invention, a dynamic predictor is used to provide a lower power consumption than the optimally fast condition, yet a faster processing speed than the condition of lowest power consumption. The misses of the lower-level cache are predicted based on the fact that misses occur in bursts which correspond to changes in the working set.

In the apparatus and method proposed, a window of size S is defined. After a miss occurs, a predicting device predicts that the next miss will occur in the next S accesses to the lower-level cache. If no miss occurs in these S accesses, a hit is predicted until the next miss.

A method of predicting access hits and misses of a lower-level cache and determining when to access one or more higher-level caches in a cache hierarchy includes the steps of: defining a window of size S for information which is sought on a cache, wherein S is measured in a number of accesses; detecting whether a hit or a miss occurs after each access of the cache; predicting, after each miss is detected, that the next miss will occur in a subsequent S accesses to the cache; and predicting, if no miss is detected within the subsequent S accesses, that the next access will be a hit.

This method is used for code access and for data reads, since data writes are handled by means of a write buffer. Therefore, the predictor method can have two parameters, $S_c$ and $S_d$, that correspond to the window sizes for code accesses and data reads, respectively. These two windows can be independent of each other: the distances between L1 cache misses may be kept separately for code accesses and data reads.

An apparatus which implements the foregoing process includes: one or more detection circuits configured to receive a signal indicating whether a hit or a miss occurs after each access of a cache and in accordance therewith output a detection signal; one or more counters coupled to the one or more detection circuits, wherein the one or more counters are configured to receive the detection signal and in accordance therewith output a counting signal, wherein the one or more counters are set to a level of size S measured in a number of accesses to the cache and wherein the counters are reset each time a miss is detected and incremented each time a hit is detected; one or more comparison circuits coupled to the one or more counters, wherein the one or more comparison circuits are configured to receive the counting signal, to determine whether the number of accesses of the cache is above, below or equal to S based on the counting signal and in accordance therewith output a comparison signal; and one or more prediction circuits coupled to the one or more comparison circuits, wherein the one or more prediction circuits are configured to receive the comparison signal, to predict a hit or miss based on the comparison signal and in accordance therewith output a prediction signal.

The features and advantages of the present invention will be more clearly understood from the following detailed description, in connection with the accompanying drawings.

DETAILED DESCRIPTION OF THE PREFERRED EMBODIMENT

Figure 1:
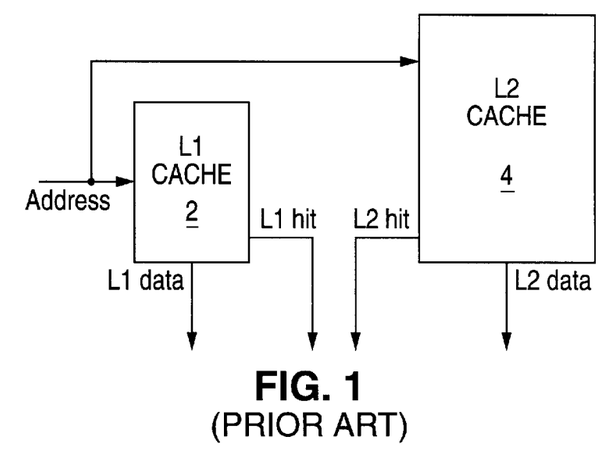
FIG. 1 is a block diagram which illustrates that portion of a conventional microprocessor, in this instance a microprocessor having two on-chip caches, in which the L2 cache is accessed at the same time the L1 cache is accessed regardless of whether there is a miss in the L1 cache.
Figure 2:
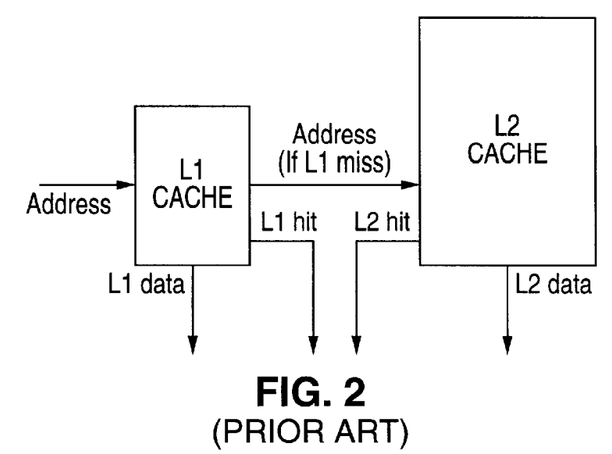
FIG. 2 illustrates that portion of a conventional microprocessor having two on-chip caches in which the L2 cache is accessed only when there is a miss in the L1 cache.

As shown in FIGS. 1 and 2, for the two-level cache organization, the following alternatives exist for the time at which the L2 cache 4 is accessed:

(a) Access the L2 cache 4 simultaneously with the L1 cache 2, irrespective of whether there will be a miss in the L1 cache 2, as shown in FIG. 1. This reduces the effective access time of the L2 cache 4 when the re is a miss in the L1 cache 2. However, this approach has the disadvantage of causing a high, useless power consumption in the L2 cache 4 when the data is provided by the L1 cache 2.

(b) Access the L2 cache 4 only when there is a miss in the L1 cache 2, as shown in FIG. 2. This results in a larger effective access time of the L2 cache 4 but has no useless power consumption.

To achieve the reduction in power consumption of approach (b) a CacheAccess input 6 is added that inhibits the pre-charging of the bit lines. Moreover, the address input is kept at the same value as for the previous access. In this situation, the cache does not consume any active power since no line toggles occur; the only source of power consumption is the static current.

Figure 3:
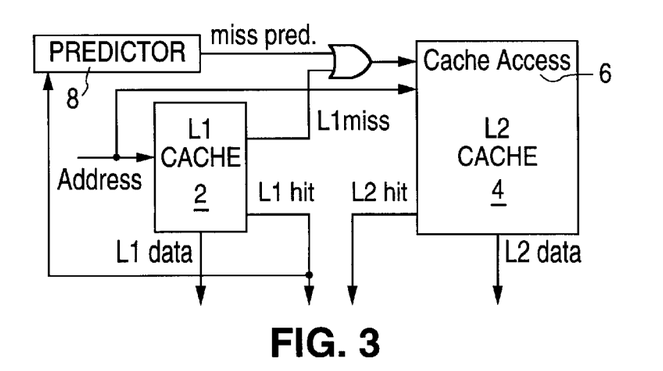
FIG. 3 illustrates that portion of a microprocessor comprising an embodiment of the presently claimed invention in which there are two on-chip caches.

As shown in FIG. 3, the proposed technique predicts the misses in the L1 cache 2 and accesses the L2 cache 4 concurrently with the L1 cache only in case a miss is predicted. On the other hand, if a hit is predicted the L2 cache 4 is only accessed if the prediction is incorrect; in this case the effective latency of the L2 cache 4 is increased by the first-level latency of the hit/miss determination.

Figure 4:
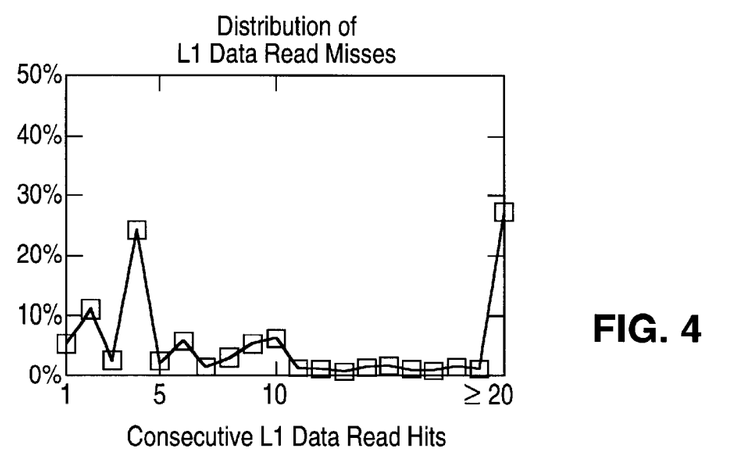
FIG. 4 is a graph of the distribution of L1 cache data read misses.
Figure 5:
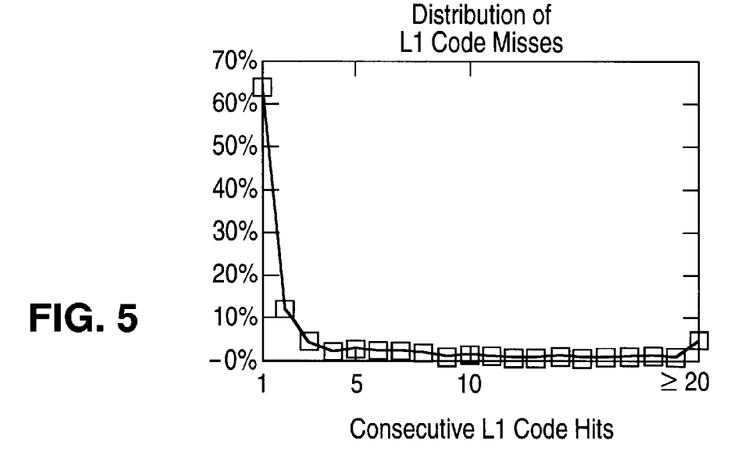
FIG. 5 is a graph of the distribution of L1 cache code access misses.

The present invention is based on the observation that the distance (in L1 cache accesses) between consecutive L1 cache 2 misses is small. This fact is illustrated in FIGS. 4 and 5, where the percentage of L1 cache 2 misses is shown as a function of the number of consecutive LI cache 2 accesses that resulted in hits.

The following examples are based on simulations of one embodiment of the present invention applied to a two-level cache hierarchy, using the SPEC95 benchmark suite and SimpleScalar tool set, which will be described below. FIG. 4 indicates that around 25% of all data read misses in the L1 cache 2 occur after 4 consecutive hits from the previous miss and 65% occur within a distance of 10. FIG. 5 indicates that for code accesses, the distances are even smaller: around 85% of the code misses occur with a distance of 5 or less. The shape of these distributions depend mainly on the workload and on the cache structure.

Ideally, the L2 cache 4 should be accessed:

1. Only when there is a miss in the L1 cache 2. This eliminates any unnecessary power consumption in the L2 cache 4; and
2. Simultaneously with the L1 cache 2. This reduces the effective latency of the L2 cache 4.

Since when the L1 cache 2 is accessed it is not known yet whether there will be a miss, to achieve this operation it is necessary to predict the miss resulting in an organization as described in FIG. 3. A perfect prediction would achieve both characteristics above. On the other hand, an incorrect prediction of a miss (when there is a hit, but a miss was predicted) produces an unnecessary access to the L2 cache 4 and an incorrect prediction of a hit (when there is a miss, but a hit was predicted) results in a larger latency. Depending which of the two characteristics is most important, a predictor that predicts better misses or hits should be used. The extremes are given by the operation modes of FIGS. 1 and 2: the first case is equivalent to always predicting a miss and the second case to always predicting a hit.

In the present invention, a window of size S is defined. After a miss occurs it is predicted that the next miss will occur in the next S accesses to the L1 cache 2. If no miss occurs in these S accesses, a hit is predicted until the next miss. This method is used for code access and for data reads, since data writes are handled by means of a write buffer. Therefore, this method can have two parameters, $S_c$ and $S_d$, that correspond to the window sizes for code accesses and data reads, respectively. Note that these two windows can be independent of each other. The distances between L1 cache 2 misses may be kept separately for code accesses and data reads.

As an example, $S_d$ is set to 3. After a data read miss (the zeroth data read), we predict that the next data read miss will occur in the next 3 data reads (the first, second or third data reads) of L1. Therefore, a miss is predicted for the first data read access. Whether or not a miss occurs for the first data read access, another miss is predicted for the second data read. Again, whether or not a miss occurs during the second data read, a miss is predicted for the third data read. However, if 3 consecutive data reads have resulted in data read hits, then a data read hit is predicted until there is a data read miss.

Figure 6:
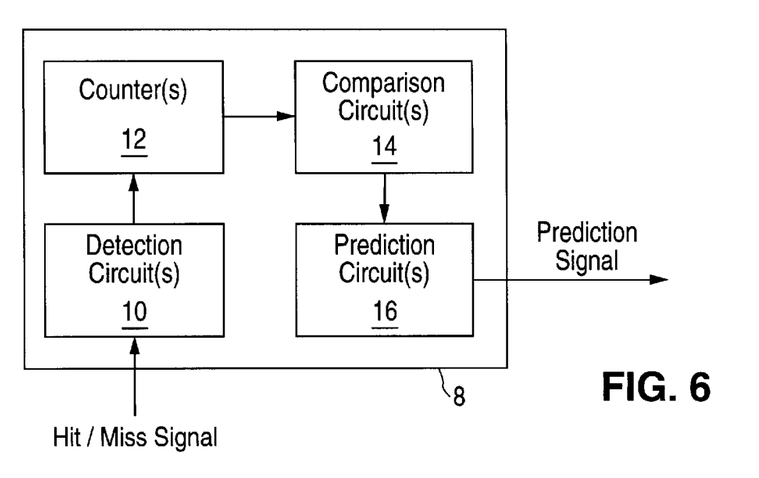
FIG. 6 is a block diagram which illustrates the detection, counting, comparison and prediction circuit(s) of one embodiment of the predictor circuit of FIGS. 3, 9 and 10.

One embodiment of this predictor circuit 8 is illustrated in FIG. 6. The predictor circuit 8 consists of one or more detection circuits 10, one or more counters 12 and one or more comparison circuits 14 to determine whether the distance in L1 cache 2 accesses is above or below the window size. The counters 12 may be saturating counters. The comparison circuits 14 may be very simple if the window size is, for example, a power of two.

In a preferred embodiment of the presently claimed invention, two detection circuits 10, counters 12 and comparison circuits 14 each are employed, one for data reads and the other for code accesses. Each counter 12 is reset by the corresponding misses and is incremented by each hit. A miss is predicted while the counter 12 is not saturated. If a hit is predicted, i.e., the counter 12 is saturated, the CacheAccess input 6 inhibits pre-charging of the bit lines, only the L1 cache 2 is accessed and thereafter power consumption is reduced. If a miss is predicted, the bit lines are pre-charged and both the L1 cache 2 and the L2 cache 4 are accessed simultaneously.

The method of the presently claimed invention has been evaluated through simulations using the SPEC95 benchmark suite. SPEC95, also known as SPEC CPU95, is a group of benchmarks established by the Standard Performance Evaluation Corporation ("SPEC"). SPEC benchmarks are widely accepted by computer scientists and engineers as standards against which to compare various aspects of computer systems. The SPEC95 benchmark suite is used by the microprocessing community as a set of standards against which to compare microprocessor configurations. See the discussions at http://open.specbench.org/, http://open.specbench.org/osg/ and http://open.specbench.org/osg/cpu95/. The SPEC95 benchmark suite is set forth in the first two columns of Table 1, below. The sets of input parameters used for simulations of the presently claimed invention are shown in the third column of Table 1.

TABLE 1

| Int/FP | Benchmark | Input parameters |
|---|---|---|
| Integer | gcc | lamptjp.i |
| | compress | bigtest.in |
| | perl | scrabbl.pl |
| | go | 50 21 |
| | m88ksim | ctl.raw |
| | li | boyer.lsp |
| | ijpeg | penguin.ppm |
| | vortex | vortex.raw |
| Floating Point | tomcatv | tomcatv.in |
| | swim | swim.in |
| | su2cor | su2cor.in |
| | hydro2d | hydro2d.in |
| | mgrid | mgrid.in |
| | applu | applu.in |
| | turb3d | turb2d.in |
| | apsi | apsi.in |
| | fpppp | natoms.in |
| | wave5 | wave5.in |

On average, for a typical two-level cache organization, about 50% of the accesses of the second-level cache are saved, producing a reduction of about 0.5% in the average instructions per cycle ("IPC") with respect to the case in which both caches are always accessed concurrently.

Figure 7:
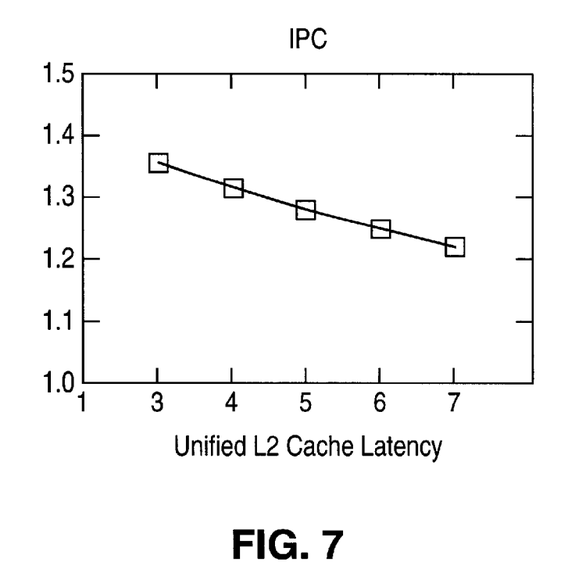
FIG. 7 is a graph of the average number of instructions per cycle ("IPC") as a function of the L2 cache data latency in processor cycles, using a predictor in accordance with one embodiment of the presently claimed invention.

FIG. 7 shows the IPC obtained for different values of the L2 cache 4 latency, by simulating the execution of the SPEC95 benchmark suite on the SimpleScalar simulator, which is widely used in the research community of micro architecture for evaluating the performance of microprocessors. For a description of the SimpleScalar simulator, see D. Burger and T. M. Austin, "The SimpleScalar Tool Set, Version 2.0," Technical Report #1324, Computer Sciences Department, Univ. of Wisconsin—Madison (June 1997) (http://www.cs.wisc.edu/mscalar/simplescalar.html). The architectural parameters listed below were used in the simulation.

TABLE 2

| Architectural parameter | Value |
|---|---|
| Fetch Queue Size | 4 instructions |
| Branch Misprediction Penalty | 3 cycles |
| Front-end/Execution Core Frequency Ratio | 1 |
| Branch Predictor | Combining (using a 1K entry table) two predictors: Bimod (2K entries) and global 2-level adaptive using a per-address pattern history table |
| Return Address Stack | 8 entries |
| Branch Target Buffer | 2K entries, 4-way set associative |
| Decode Width | 4 instructions/cycle |
| Issue Width | 4 instructions |
| In-order/Out-of order Issue | Out-of-order |
| Issue instructions down wrong execution paths | True |
| Commit Width | 4 instructions/cycle |
| Reservation Station Size | 16 entries |
| Load/Store Queue Size | 8 entries |
| Cache Line Size | 64 bytes |
| L1 Data Cache Configuration | 16 KB, 2-way, LRU replacement, write-back |
| L1 Data Cache Latency | 1 cycle |
| L1 Code Cache Configuration | 16 KB, 2-way, LRU replacement, write-back |
| L1 Code Cache Latency | 1 cycle |
| Data TLB Configuration | 64 entries, 4-way, 4 M pages, LRU replacement |
| Data TLB Latency | 1 cycle |
| Code TLB Configuration | 128 entries, 4-way, 4 M pages, LRU |

TABLE 2-continued

| Architectural parameter | Value |
|---|---|
| | replacement |
| Code TLB Latency | 1 cycle |
| Code/Data TLB miss latency | 30 cycles |
| L2 Cache Configuration | Unified 128 KB, 4-way, LRU replacement, write-back |
| Main Memory Access Latency | 18 cycles |
| Memory Access Bus Width | 8 bytes |
| Memory System Ports | 2 |
| Integer ALUs | 4 |
| Integer Multipliers/Dividers | 1 |
| FP ALUs | 4 |
| FP Multipliers/Dividers | 1 |

The parameters in Table 2 are the default values used in the SimpleScalar simulator, except for the cache sizes (which are set to 2-way, 16 KB for the L1 cache 2, and 4-way, 128 KB for the unified L2 cache 4).

An IPC degradation of approximately 3% occurs when the L2 cache 4 latency increases from 3 to 4, or from 4 to 5 cycles. This degradation is smaller for larger latencies, and is around 2% when going from 5 to 6 or from 6 to 7 cycles. This IPC degradation may be too high for high-performance processors; however, the increment in internal power consumption due to the first approach, in which the effective L2 cache 4 latency is smaller, may also be a factor that prevents the microprocessor from being implemented. Thus, the proposed hardware algorithm reduces the useless power consumption due to the on-chip L2 cache 4 at the expense of slightly decreasing the IPC of the microprocessor.

To determine the effectiveness of the prediction policy, the fraction of correct predictions, for both misses and hits, when varying the size of the window are presented in Table 3. As expected, when the size of either window is increased, the corresponding prediction of misses improves and that of hits deteriorates.

The predictor presented in Kessler is also evaluated. This predictor is good in predicting the hits but has a poor performance in predicting the misses. The fraction of misses of the L1 cache 2 correctly predicted is related to the fraction of accesses to the L2 cache 4 which have a smaller latency. However, this has to be corrected by the misses to the L2 cache. The corresponding values are shown in Table 4 as Fast Hits, both for data and for code.

Similarly, the fraction of hits of the L1 cache 2 correctly predicted relates to the accesses of the L2 cache 4 that are saved. The fraction of accesses saved is given by this value with respect to the total number of accesses that would be required when the L2 cache 4 is accessed in every access of the L1 cache 2. Note that this total includes all the data writes.

TABLE 3

| | % L1 Data Read Pred. | | | % L1 Code Pred. | |
|---|---|---|---|---|---|
| Predictor | hit | miss | Predictor | hit | miss |
| $S_d = 4$ | 92 | 45 | | | |
| $S_d = 8$ | 88 | 60 | $S_c = 2$ | 91 | 80 |
| $S_d = 16$ | 82 | 72 | $S_c = 4$ | 87 | 84 |
| $S_d = 32$ | 75 | 81 | $S_c = 16$ | 76 | 95 |
| $S_d = 128$ | 51 | 94 | $S_c = 32$ | 67 | 97 |
| $S_d = 1024$ | 18 | 99 | | | |
| Kessler | 99 | 1 | Kessler | 94 | 58 |

TABLE 4

| Predictor | % L2 Data Read Fast Hits | % L2 Data Read Saved Accesses | Predictor | | % L2 Total Saved Accesses |
|---|---|---|---|---|---|
| $S_d = 4$ | 51 | 90 | $S_c = 2,$ | $S_d = 4$ | 68 |
| $S_d = 8$ | 60 | 86 | $S_c = 4$ | $S_d = 4$ | 67 |
| $S_d = 16$ | 71 | 80 | | $S_d = 8$ | 65 |
| $S_d = 32$ | 80 | 73 | | $S_d = 16$ | 63 |
| $S_d = 128$ | 94 | 50 | $S_c = 16$ | $S_d = 8$ | 62 |
| $S_d = 1024$ | 100 | 18 | | $S_d = 32$ | 56 |
| | | | | $S_d = 128$ | 46 |
| Predictor | % L2 Code Fast Hits | % L2 Code Saved Accesses | | $S_d = 1024$ | 31 |
| $S_c = 2$ | 79 | 82 | $S_c = 32$ | $S_d = 8$ | 60 |
| $S_c = 4$ | 84 | 78 | | $S_d = 32$ | 54 |
| $S_c = 16$ | 95 | 68 | | $S_d = 128$ | 44 |
| $S_c = 32$ | 97 | 62 | | $S_d = 1024$ | 29 |
| Kessler | 57 | 84 | Kessler | | 72 |

The poor performance in predicting the L1 cache 2 misses of the predictor presented in Kessler results in an operation with a small number of fast L2 cache 4 hits, ie., a larger L2 cache 4 latency.

The fraction of fast accesses to the L2 cache 4 has an effect on the IPC. A simple estimate of this effect can be obtained by interpolating the values given in FIGS. 4 and 5. For instance, if the latency of the L2 cache 4 is 4 and 80% of the accesses are fast accesses, a degradation of 0.2×3= 0.6% is expected. This would be obtained achieving a 60% of savings in the accesses to the L2 cache 4.

One benefit of the proposed method is the better prediction of misses in the L1 cache 2. This results in a lower L2 cache 4 latency degradation and consequently in a lower IPC degradation.

Figure 8:
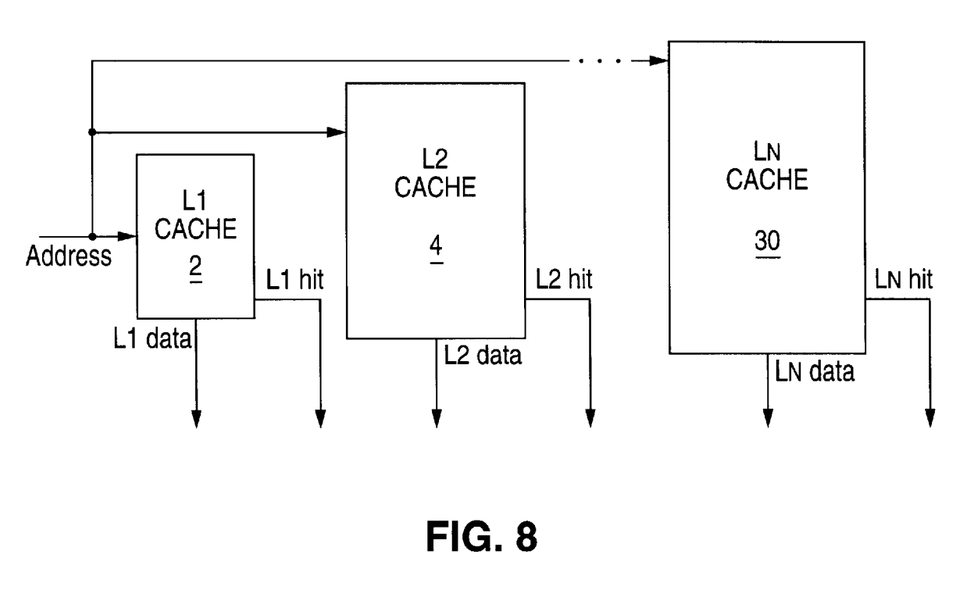
FIG. 8 illustrates a portion of a cache hierarchy with N caches, in which all caches are accessed simultaneously.

The foregoing description has been limited to the case of a microprocessor with two on-chip caches. However, the present invention applies to a microprocessor with any number of on-chip caches. FIG. 8 illustrates a microprocessor with N caches, wherein caches L12 through $L_N$ 30 are accessed simultaneously.

The presently claimed invention includes a method for reducing the power consumption of a multi-cache microprocessor, which dynamically predicts the misses of an $i^{th}$-level ($L_i$) cache. This method predicts the misses in $L_i$ and accesses the i+1 level cache ($L_{i+1}$) concurrently with $L_i$ only if a miss is predicted. If a hit is predicted, $L_{i+1}$ is accessed only if the prediction is incorrect. The prediction is based on the fact that misses occur in bursts which correspond to changes of the working set. A circuit implementing this technique occupies a very small area and its delay is not in the critical path of the microprocessor. The prediction is applied to reduce the number of unnecessary accesses to $L_{i+1}$, which translates to a reduction in power consumption in the $L_{i+1}$ cache.

Figure 9:
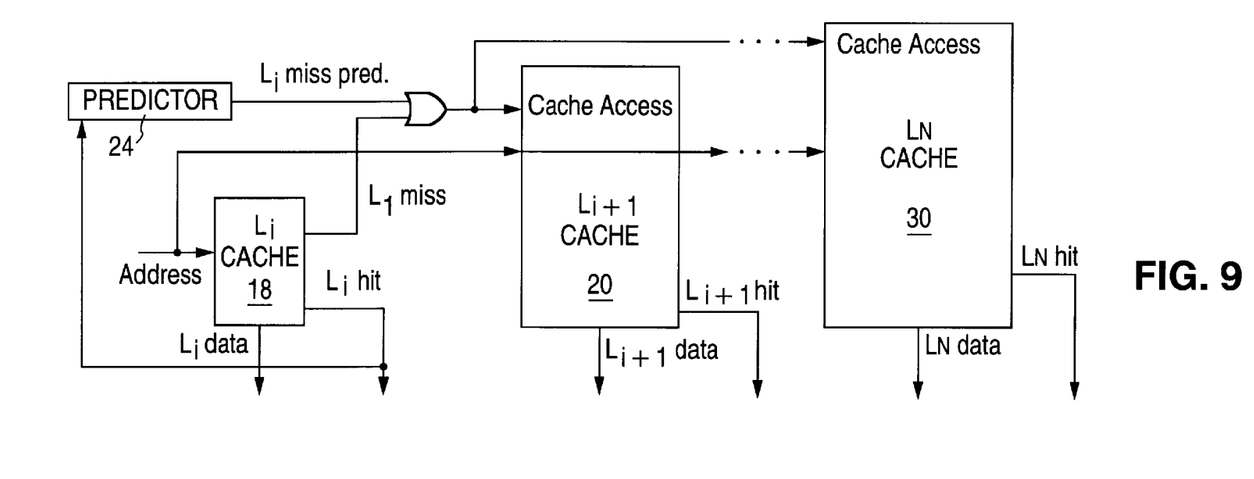
FIG. 9 illustrates a portion of a cache hierarchy with N caches and an $i^{th}$ predictor placed at an $i^{th}$ level of the cache hierarchy in accordance with another embodiment of the presently claimed invention, wherein the $i^{th}$ predictor enables or disables the i+1 through N levels based on the hit or miss prediction for level i.

FIG. 9 illustrates that portion of a microprocessor in accordance with another embodiment of the presently claimed invention. Here, a prediction circuit 24 predicts hits or misses of an arbitrary cache $L_i$ 18. The prediction circuit 24 either enables or disables all levels of the cache hierarchy, caches $L_{i+1}$ 20 through $L_N$ 30.

Figure 10:
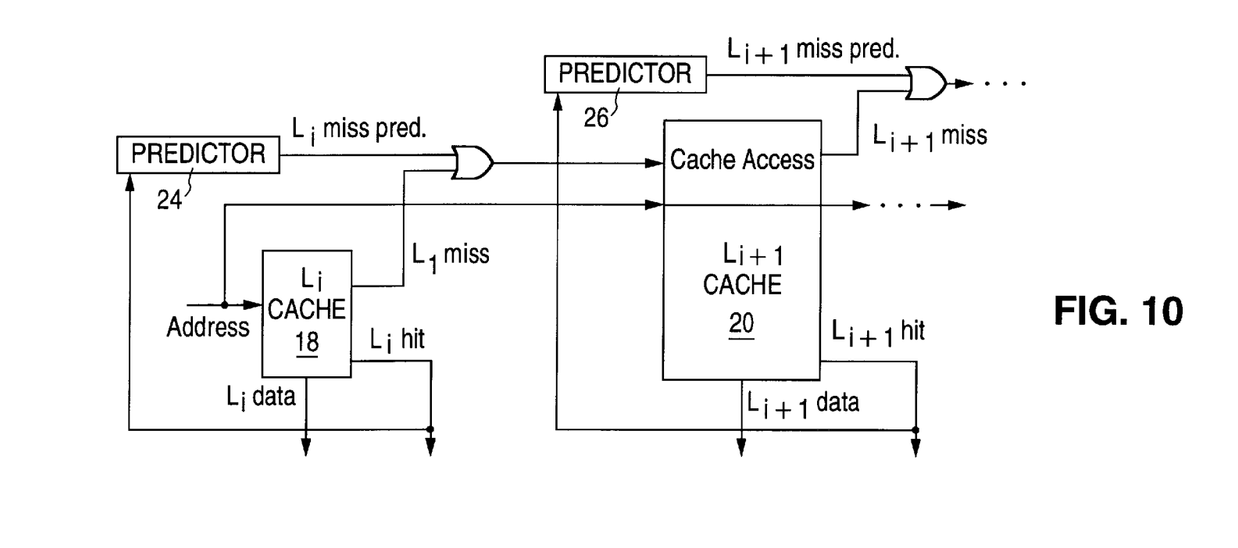
FIG. 10 illustrates that portion of a cache hierarchy with an $i^{th}$ predictor placed at an $i^{th}$ level of the cache hierarchy in accordance with another embodiment of the presently claimed invention, wherein the $i^{th}$ predictor enables or disables only the i+1 level cache based on the hit or miss prediction for level i. Here, the i+1 cache could have (but does not need to have) a predictor for enabling or disabling one or more higher-level caches. Subsequent higher-level caches (e.g., the i+2 cache, the i+3 cache, and so on) could also have predictors.

FIG. 10 illustrates that portion of a microprocessor in accordance with another embodiment of the presently claimed invention. Here, a prediction circuit 24 predicts hits or misses of an arbitrary cache $L_i$ 18. The prediction circuit 24 either enables or disables only the next level of the cache hierarchy, cache $L_{i+1}$ 20. Cache $L_{i+1}$ 20 could have—but need not have—another prediction circuit 26 which controls one or more of the caches $L_{i+1}$ 28 through $L_N$ 30.

While the foregoing is a complete description of the preferred embodiment of the invention, various alternatives and modifications may be used. Therefore, the preferred embodiment should not be interpreted to limit the scope of the present invention, which is defined by the following claims.

I claim:

1. A method of predicting access hits and misses of a memory cache and determining when to access one or more higher-level memory caches in a cache hierarchy, comprising the steps of:

defining a window of size S for information which is sought on a memory cache, wherein S is measured in a number of accesses;

detecting whether a hit or a miss occurs after each access of the memory cache;

predicting, after each miss is detected, that the next miss will occur in a subsequent S accesses to the memory cache;

predicting, if no miss is detected within the subsequent S accesses, that the next access of the cache memory will be a hit; and inhibiting a pre-charging of a plurality of bit lines to one or more higher-level memory caches if a hit is predicted in the cache memory.

2. The method of claim 1, wherein the memory cache is an on-chip cache.

3. The method of claim 1, wherein the step of inhibiting comprises:

inhibiting the pre-charging of only the next level memory cache in the cache hierarchy if a hit is predicted.

4. The method of claim 1, wherein:

the step of defining comprises defining a window $S_c$ for code accesses;

the step of detecting comprises detecting misses and hits for code accesses; and the steps of predicting comprise predicting hits and misses for code accesses based on the detected misses and hits for code accesses and based on the window $S_c$.

5. The method of claim 1, wherein:

the step of defining comprises defining a window $S_d$ for data reads;

the step of detecting comprises detecting misses and hits for data reads; and the steps of predicting comprise predicting hits and misses for data reads based on the detected misses and hits for data reads and based on the window $S_d$.

6. An apparatus including a predictor circuit for predicting the hits and misses of a memory cache and determining when to access one or more higher-level memory caches in a cache hierarchy, comprising:

one or more detection circuits configured to receive a signal indicating whether a hit or a miss occurs after each access of a memory cache and in accordance therewith output a detection signal;

one or more counters coupled to the one or more detection circuits, wherein the one or more counters are configured to receive the detection signal, are set to a level of size S measured in a number of accesses to the memory cache and wherein the counters are reset each time a miss is detected and incremented each time a hit is detected, and in accordance therewith output a counting signal;

one or more comparison circuits coupled to the one or more counters, wherein the one or more comparison circuits are configured to receive the counting signal, to determine whether the number of accesses of the memory cache is above, below or equal to S based on the counting signal and in accordance therewith output a comparison signal;

one or more prediction circuits coupled to the one or more comparison circuits, wherein the one or more prediction circuits are configured to receive the comparison signal, to predict a hit or miss based on the comparison signal and in accordance therewith output a prediction signal; and wherein at least one of the one or more higher-level memory caches includes an input which selectively inhibits pre-charging of one or more of a plurality of bit lines therein and wherein the apparatus further comprises:

one or more decision circuits coupled to the one or more prediction circuits, wherein the one or more decision circuits are configured to receive the prediction signal and in accordance therewith output a decision signal which indicates whether pre-charging of one or more of a plurality of bit lines should be inhibited.

7. The apparatus of claim 6, wherein inhibition of pre-charging of the plurality of bit lines in a next level memory cache in the cache hierarchy is indicated by the decision signal if a hit is predicted.

8. The apparatus of claim 6, wherein:

at least one of the one or more detection circuits is configured to detect misses and hits for code accesses of the memory cache and in accordance therewith output a code access detection signal;

at least one of the one or more counters is configured to receive a code access detection signal and is set to a level of $S_c$ for code accesses of the memory cache, wherein $S_c$ is measured in a number of code accesses of the memory cache and wherein the counter is reset each time a code access miss is detected and incremented each time a code access hit is detected, and in accordance therewith output a code access counting signal;

at least one of the one or more comparison circuits is configured to receive a code access counting signal, to determine whether the number of code accesses of the memory cache is above, below or equal to $S_c$ and in accordance therewith output a code access comparison signal; and wherein at least one of the one or more prediction circuits is configured to receive a code access comparison signal, to predict a hit or miss based on the code access comparison signal and in accordance therewith output a code access prediction signal.

9. The apparatus of claim 8, wherein at least one of the one or more higher-level memory caches includes an input which selectively inhibits pre-charging of one or more of a plurality of bit lines therein and wherein the apparatus further comprises:

one or more decision circuits coupled to at least one of the one or more prediction circuits, wherein the one or more decision circuits are configured to receive the code access prediction signal and in accordance therewith output a code access decision signal which indicates whether pre-charging of one or more of a plurality of bit lines should be inhibited.

10. The apparatus of claim 9, wherein inhibition of pre-charging of the plurality of bit lines in a next level memory cache in the cache hierarchy is indicated by the decision signal if a code access hit is predicted.

11. The apparatus of claim 6, wherein:
at least one of the one or more detection circuits is configured to detect misses and hits for data reads of the memory cache and in accordance therewith output a data read detection signal;
at least one of the one or more counters is configured to receive a data read detection signal and is set to a level of $S_d$ for data reads of the memory cache, wherein $S_d$ is measured in a number of data reads of the memory cache and wherein the counter is reset each time a data read miss is detected and incremented each time a data read hit is detected, and in accordance therewith output a data read counting signal;
at least one of the one or more comparison circuits is configured to receive a data read counting signal, to determine whether the number of data reads of the memory cache is above, below or equal to $S_d$ and in accordance therewith output a data read comparison signal; and wherein
at least one of the one or more prediction circuits is configured to receive a data read comparison signal, to predict a hit or miss based on the data read comparison signal and in accordance therewith output a data read prediction signal.

12. The apparatus of claim 11, wherein at least one of the one or more higher-level memory caches includes an input which selectively inhibits pre-charging of one or more of a plurality of bit lines therein and wherein the apparatus further comprises:
one or more decision circuits coupled to at least one of the one or more prediction circuits, wherein the decision circuits are configured to receive the data read prediction signal and in accordance therewith output a data read decision signal which indicates whether pre-charging of one or more of a plurality of bit lines should be inhibited.

13. The apparatus of claim 12, wherein inhibition of pre-charging of the plurality of bit lines in a next level memory cache in the cache hierarchy is indicated by the decision signal if a data read hit is predicted.

14. The apparatus of claim 6, wherein the one or more counters are saturating counters.

* * * * *